(12) United States Patent
Chen et al.

(10) Patent No.: US 8,317,393 B2
(45) Date of Patent: Nov. 27, 2012

(54) TIME DOMAIN DIGITAL TEMPERATURE SENSING SYSTEM AND METHOD THEREOF

(75) Inventors: Poki Chen, Taipei (TW); Chun-chi Chen, Taipei (TW); Tuo-kuang Chen, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 1118 days.

(21) Appl. No.: 12/185,976

(22) Filed: Aug. 5, 2008

(65) Prior Publication Data

US 2009/0141770 A1 Jun. 4, 2009

(30) Foreign Application Priority Data

Dec. 4, 2007 (TW) ................................ 96146142 A

(51) Int. Cl.
*G01K 7/00* (2006.01)
(52) U.S. Cl. .......................................... 374/170; 374/163
(58) Field of Classification Search .................. 374/163, 374/170, 171; 345/106; 349/77; 327/512–513
See application file for complete search history.

(56) References Cited

U.S. PATENT DOCUMENTS

| | | | | |
|---|---|---|---|---|
| 3,567,914 A * | 3/1971 | Neese et al. | ................... | 716/137 |
| 3,972,237 A * | 8/1976 | Turner | ........................... | 374/169 |
| 4,156,180 A * | 5/1979 | Annen et al. | ................... | 324/692 |
| 4,641,246 A * | 2/1987 | Halbert et al. | ................ | 341/163 |
| 4,677,618 A * | 6/1987 | Haas et al. | ..................... | 714/700 |
| 4,718,036 A * | 1/1988 | Halbert et al. | ................. | 708/823 |
| 4,807,147 A * | 2/1989 | Halbert et al. | .................. | 702/66 |
| 6,351,231 B1 * | 2/2002 | Price et al. | ...................... | 341/155 |
| 7,078,955 B2 * | 7/2006 | Kim et al. | ...................... | 327/512 |
| 7,331,708 B2 * | 2/2008 | Blom et al. | ..................... | 374/171 |
| 7,372,448 B2 * | 5/2008 | Kim | ............................... | 345/106 |
| 7,455,452 B2 * | 11/2008 | Seo | ............................... | 374/171 |
| 2006/0176052 A1 | 8/2006 | Seo | | |
| 2007/0195856 A1 | 8/2007 | Blom et al. | | |
| 2011/0200070 A1 * | 8/2011 | Makinwa et al. | ............. | 374/170 |

FOREIGN PATENT DOCUMENTS

TW I245175 1/2005

OTHER PUBLICATIONS

A SAR-Based Smart Temperature Sensor with Binary-Weighted Search Algorithm, ( 18th VLSI Design/CAD Symposium, C3-3,Taiwan, Aug. 7-10, 2007).

* cited by examiner

*Primary Examiner* — Peter Macchiarolo
*Assistant Examiner* — Tania Courson
(74) *Attorney, Agent, or Firm* — Kirton McConkie; Evan R. Witt

(57) ABSTRACT

A digital temperature sensing system and method for converting a test temperature into a digital output signal are disclosed. The system comprises a temperature-to-time circuit for generating a thermally sensitive time signal of which a width varies with the test temperature; an adjustable time reference circuit for generating a time reference signal of which a width changes with the digital set value; a time comparator for generating a time comparison signal according to a width difference between the thermally sensitive time signal and the time reference signal; a logic control circuit for adjusting the digital set value of the adjustable time reference circuit according to the time comparison signal so that the width of the thermally sensitive time signal and the width of time reference signal are close enough or substantially equal.

20 Claims, 16 Drawing Sheets

TIME DOMAIN DIGITAL TEMPERATURE SENSING SYSTEM AND METHOD THEREOF

This application claims the priority of Taiwan Patent Application No. 096146142, filed on Dec. 4, 2007. This invention is partly disclosed in a published article, Chun-Chi Chen, Poki Chen, and Kai-Ming Wang, "A SAR-Based Smart Temperature Sensor with Binary-Weighted Search Algorithm," 18$^{th}$ VLSI Design/CAD Symposium, C3-3, Taiwan, 7-10 Aug. 2007.

TECHNICAL FIELD OF THE INVENTION

The present invention relates to a digital temperature sensing system and a method thereof. Particularly, the present invention relates to a digital temperature sensing system that is applicable to a central processing unit (CPU), a chipset, a battery protection circuit, an environmental monitoring system, an electromechanical system, or other circuits and systems that need temperature sensing circuits.

BACKGROUND OF THE INVENTION

Various techniques for digital temperature sensing are heretofore known. Some of these techniques rely on thermal resistors to measure a temperature. The measured temperature is converted into a voltage or current signal, and an analog-to-digital converter (ADC) is utilized for subsequent digital output coding of the voltage or current signal.

FIG. 1 of the attached drawings shows a conventional temperature sensing system, broadly designated at 10. The conventional temperature sensing system 10 consists of a temperature sensor 11, a reference circuit 12, and an ADC 13. In order to be fully compatible with standard digital CMOS fabrication processes, the temperature sensor 11 generally adopts parasitic substrate or lateral bipolar transistors for temperature sensing. The temperature sensor 11 generates a voltage or current which varies with temperature. The reference circuit 12 generates a band-gap reference voltage or current that is generally constant with respect to temperature variation. A voltage or current difference between the temperature sensor 11 and the reference circuit 12 is converted into a digital signal by the ADC 13.

For the temperature sensor 11, bipolar transistors are generally adopted for generating the voltage or current corresponding to the measured temperature. However, the behavior or characteristic of bipolar transistors is hard to handle in the fabrication processes, and a significant difference often exists between the theoretic values and the actual values, making it difficult for mass production. In addition, the characteristic curve of the voltage (or the current) vs. temperature usually has problems caused by its curvature. Therefore, the conventional temperature sensing system 10 needs additional calibration circuits for reducing measurement error. It leads to the increase of both chip area and power consumption. Moreover, the reference circuit 12 still needs to use bipolar transistors, and thus has the same problems faced by the temperature sensor 11. As for the ADC 13, it is the important core of the temperature sensing system 10 for output signal digitization. The resolution of the temperature sensing system 10 is decided by the effective output bits of the ADC 13. For a temperature sensing circuit with 0.1° C. temperature resolution for a temperature range over 100° C., an ADC with more than 10 output bits is required to obtain the necessary resolution, often at the expense of large chip area and high power consumption. Furthermore, the above-mentioned three components all need to be implemented with operational amplifiers (OP-AMP). However, the input offset voltage of OP-AMP seriously limits the performance of the temperature sensing system 10. Consequently, it needs a dynamic offset cancellation circuit to improve accuracy and makes the temperature sensing system 10 more complicated. It further increases the chip cost and power consumption. However, the cost, power consumption, and accuracy are most important specifications for temperature sensing chips.

Therefore, there is a need to develop a new temperature sensing system and method for improving the above-mentioned disadvantage of the conventional system.

SUMMARY OF THE INVENTION

The present invention provides a digital temperature sensing system for converting a test temperature into a digital output signal. The digital temperature sensing system comprises a temperature-to-time circuit for generating a thermally sensitive time signal of which a width varies with the test temperature; an adjustable time reference circuit, which has a digital input terminal for receiving a digital set value from the digital input terminal and generating a time reference signal of which a width varies according to the digital set value; a time comparator, which receives the thermally sensitive time signal and the time reference signal for generating a time comparison signal according to a width difference between the thermally sensitive time signal and the time reference signal; a logic control circuit, which receives the time comparison signal for adjusting the digital set value of the adjustable time reference circuit according to the time comparison signal so that the width of the thermally sensitive time signal and the width of time reference signal are made close enough or substantially equal; and a digital output terminal, which is electrically connected to the digital input terminal of the adjustable time reference circuit for providing the digital output signal to be the output of the digital temperature sensing system.

The present invention also provides a digital temperature sensing method for converting a test temperature into a digital output signal. The digital temperature sensing method comprises the steps of: generating a thermally sensitive time signal of which a width varies with the test temperature; generating a time reference signal of which a width changes with a digital set value; generating a time comparison signal according to a width difference between the thermally sensitive time signal and the time reference signal; determining whether the width of the thermally sensitive time signal and the width of time reference signal are close enough or substantially equal; and adjusting the digital set value according to the time comparison signal.

Conventional temperature sensing system is operated in the voltage-domain. For a fixed operation voltage, to obtain a high resolution, a small unit voltage $V_{LSB}$ corresponding to the least significant bit of the digital set value is required. Due to the limitation imposed by input offset voltage of the subsequent voltage comparator, the difficulty for voltage discrimination increases as the unit voltage $V_{LSB}$ becomes small, and the measurement error increases also. Unlike the conventional systems, the digital temperature sensing system in accordance with the present invention is operated in the time-domain. If the resolution of the time-domain circuit is to be enhanced, the designer can simply stretch the time operation range instead of lowering the quantization levels $T_{LSB}$, a unit time corresponding to a least significant bit of the digital set value, in the time axis. As a result, the measurement error caused by the finite time discrimination capability of the subsequent time comparator will not increase. In addition, the operation voltage is scaled down with the evolution of fabrication processes. It makes the unit voltage $V_{LSB}$ become smaller, even the required resolution is fixed. Therefore, a more complicated calibration circuit will be needed to reduce the measurement error. This further increases the chip cost and power consumption. Conversely, the time-domain digital temperature sensing system in accordance with the present invention is not affected by lowering the operation voltage. Furthermore, the dead zone of the time comparator (usually a D-type flip-flop, DFF) will decrease as the fabrication processes scaled down. The discrimination capability of the digital temperature sensing system in accordance with the present invention is thus improved so that the measurement error is reduced. Thus, it is beneficial to develop the time-domain digital temperature sensing system.

DETAILED DESCRIPTION OF THE INVENTION

The present invention will now be described more specifically with reference to the following embodiments. It is noted that the following description of the preferred embodiments of the present invention are presented herein for purpose of illustration and description only, and it is not intended to be exhaustive or to be limited to the precise form disclosed.

Figure 1:
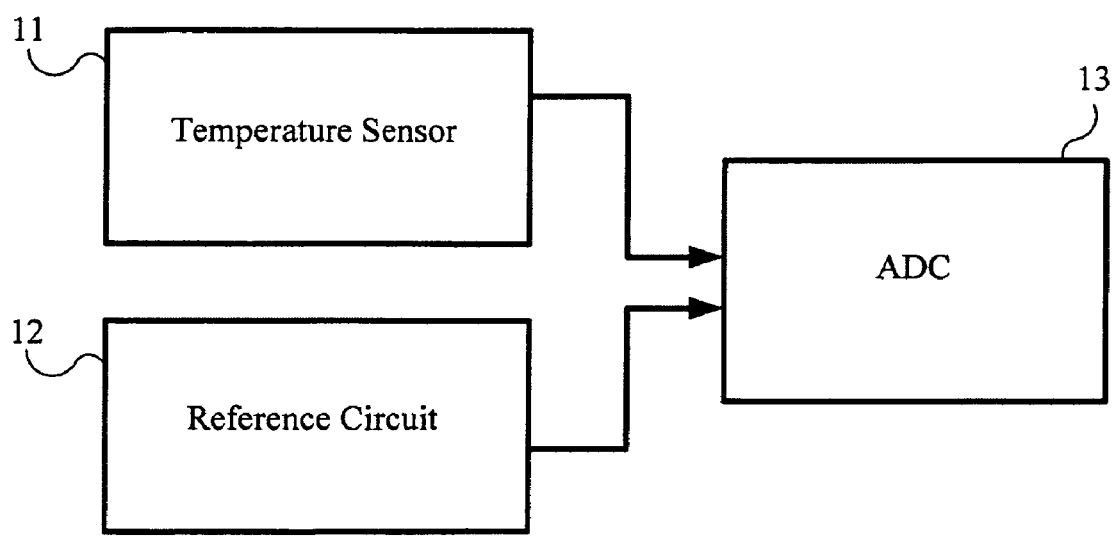
FIG. 1 is a diagram depicting a conventional temperature sensing system.
Figure 2:
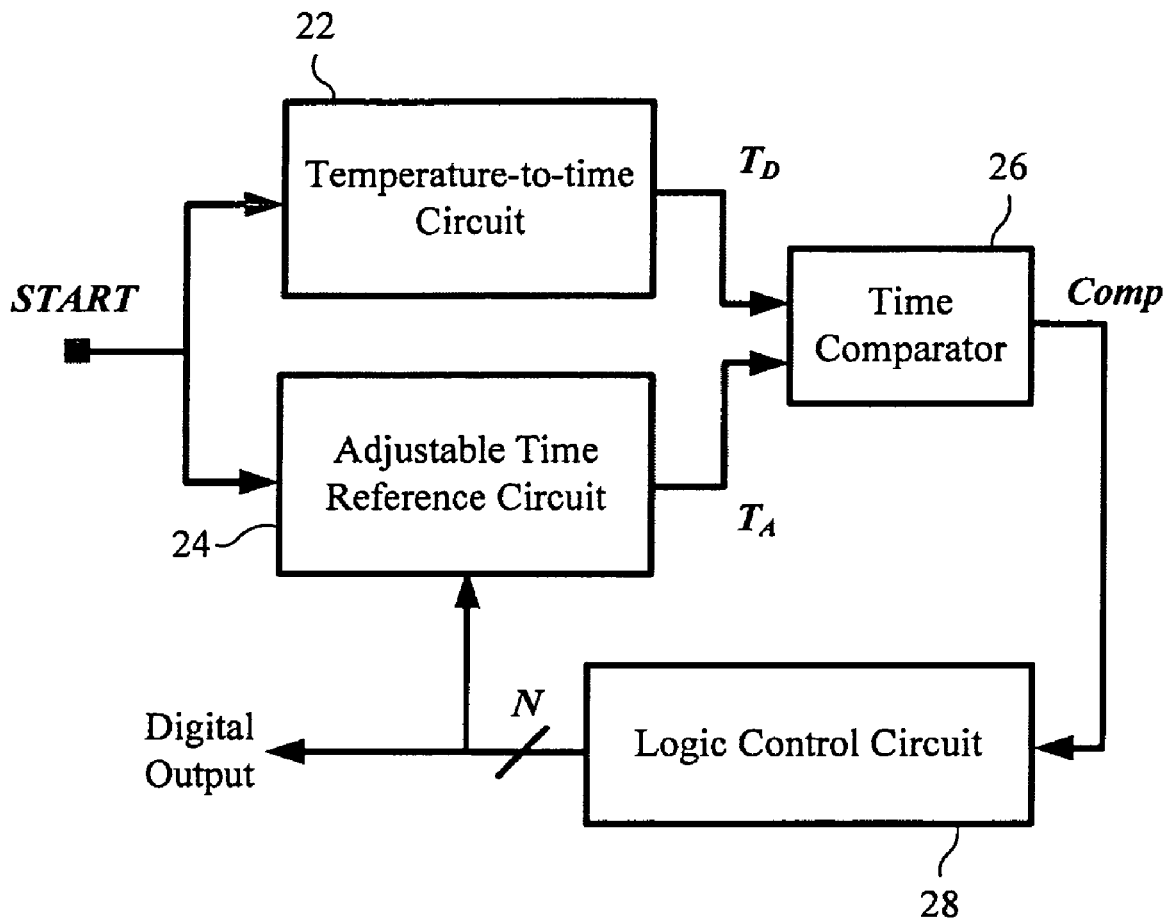
FIG. 2 is a block diagram illustrating a digital temperature sensing system in accordance with the present invention.

The present invention relates to a digital temperature sensing system, as well as a method, that converts a "test temperature" into a digital output signal. It is noted that the term "test temperature" used herein simply refers to, for example, an external temperature of the environment in which the digital temperature sensing system of the present invention is positioned. The digital temperature sensing system, broadly designated at 20, in accordance with a preferred embodiment of the present invention is illustrated in FIG. 2. The digital temperature sensing system 20 comprises a temperature-to-time circuit 22, an adjustable time reference circuit 24, a time comparator 26, and a logic control circuit 28. The temperature-to-time circuit 22 functions for sensing the test temperature and generating a thermally sensitive time signal $T_D$ according to the test temperature sensed. The adjustable time reference circuit 24 functions for converting a "digital signal" to a time reference signal $T_A$, and different digital signal inputs provide time reference signals $T_A$ of different time delays. The "digital signal" is a digital set value generated by the logic control circuit 28, which will be further described. It is noted here and for the preferred embodiment of the present invention illustrated herein that the time reference signal $T_A$ is less thermally sensitive or even thermally insensitive, as compared to the previously mentioned thermally sensitive time signal $T_D$ from the temperature-to-time circuit 22. The time comparator 26 determines a difference in time (namely lagging or leading) of the time reference signal $T_A$ with respect to the thermally sensitive time signal $T_D$ and, in response thereto, generates a time comparison signal Comp to the logic control circuit 28. The logic control circuit 28 adjusts a digital set value, which is fed to the adjustable time reference circuit

24 to vary the width of its output signal $T_A$ according to the time comparison signal Comp of the time comparator 26 in an iterative manner for making the time reference signal $T_A$ of the temperature-to-time circuit 22 gradually approaching the thermally sensitive time signal $T_D$, until the digital set value that makes the time reference signal $T_A$ closest to the thermally sensitive time signal $T_D$ is obtained and assigned as the output of the digital temperature sensing system 20.

The operation of the digital temperature sensing system 20 will be described as follows. An input, which is considered a "start" signal, START, is first fed to or received by the digital temperature sensing system 20. The start signal START is preferably a step signal. The start signal START is applied to both the temperature-to-time circuit 22 and the adjustable time reference circuit 24. In response to the application of the start signal START, the temperature-to-time circuit 22 generates the thermally sensitive time signal $T_D$ of which a delay varies with the test temperature. The delay of the signal $T_D$ is preferably varied with the test temperature in a linear fashion. In the meanwhile, with the receipt of the start signal START, the adjustable time reference circuit 24 generates the time reference signal $T_A$ with the digital set value (which as mentioned above represents the "digital signal" fed to the adjustable time reference circuit 24) adjusted by the logic control circuit 28. The delay or width of the time reference signal $T_A$ is determined by the digital set value adjusted by the logic control circuit 28. The delay of the time reference signal $T_A$ is generally constant with respect to temperature variation, meaning the delay is insensitive or slightly sensitive to temperature variation. By the time comparison signal Comp issued by the time comparator 26, it can be known whether the signal $T_A$ leads the signal $T_D$ or not. The logic control circuit 28 can adjust the digital set value according to the time comparison signal Comp until the delay of the signal $T_A$ is closest to the delay of the signal $T_D$. And, the digital set value of logic control circuit 28 so obtained is assigned as the output of the digital temperature sensing system 20.

Figure 3:
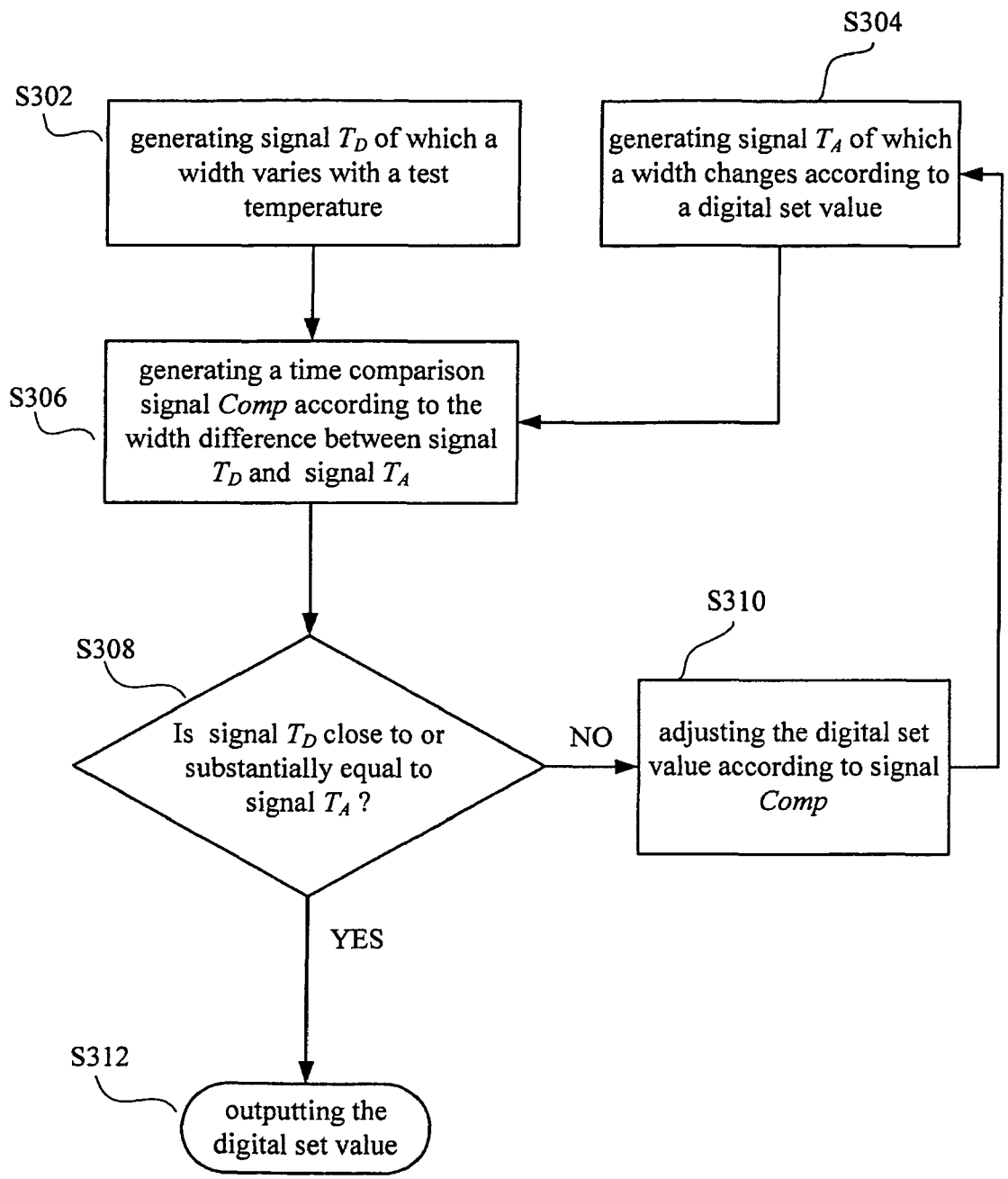
FIG. 3 is a flow chart illustrating a digital temperature sensing method in accordance with the present invention.

Referring to FIG. 3, which shows a flow chart illustrating a digital temperature sensing method for converting a test temperature into a digital output signal in accordance with the present invention. The digital temperature sensing method comprises:

Step S302: generating a thermally sensitive time signal $T_D$ of which a width varies with the test temperature;

Step S304: generating a time reference signal $T_A$ of which a width changes according to a digital set value, where the signal $T_A$ is less thermally sensitive or thermally insensitive;

Step S306: generating a time comparison signal Comp according to a width difference between the thermally sensitive time signal $T_D$ and the time reference signal $T_A$;

Step S308: determining whether the width of the thermally sensitive time signal $T_D$ and the width of time reference signal $T_A$ are close enough or are substantially equal, and going to Step S310 if negative, otherwise going to Step S312;

Step S310: adjusting the digital set value according to the time comparison signal Comp and repeating Steps S304-S308; and Step S312: outputting the digital set value if "YES" in the determining step S308.

Figure 4A:
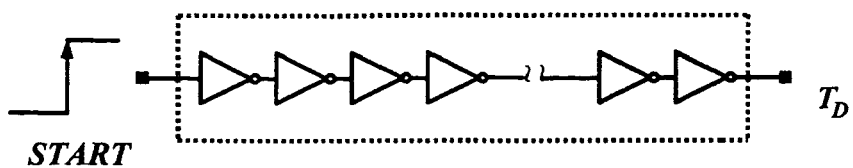
FIG. 4a is a diagram showing a delay line of a temperature-to-time circuit in accordance with a preferred embodiment of the present invention.

The operation principle of the present invention will be described. The current flowing through the temperature-to-time circuit 22, which may consist of a plurality of delay cells, varies with the test temperature. The propagation delay of the temperature-to-time circuit 22 is thus changed. Based on this principle, the temperature-to-time circuit 22 can be designed to generate a signal with a delay almost linearly dependent on temperature variation. The temperature-to-time circuit 22 can be employed as a delay line consisting of a plurality of delay cells for temperature sensing. In one embodiment, the temperature-to-time circuit 22 is a delay line consisting of a plurality of CMOS inventors, as shown in FIG. 4*a*. Since the current flowing in the delay cells varies with the test temperature, the charging/discharging capability of the delay cells is affected. Therefore, the delay line results in different delays at different temperatures. This characteristic is employed to design the temperature-to-time circuit 22. Taking a single CMOS inverter as an example, the transmission delay is represented as:

$$T_p = \frac{(L/W)C_L}{\mu C_{ox}(V_{DD}-V_T)} \ln\left(\frac{1.5V_{DD}-2V_T}{0.5V_{DD}}\right)$$

Generally, the voltage $V_{DD}$ supplied in digital circuits is much greater than the threshold voltage $V_T$ of a transistor. Therefore, the transmission delay $T_P$ is affected mostly by the mobility μ. However, the relation between the mobility and temperature is $$\mu = \mu_0\left(\frac{T}{T_0}\right)^{km}, km = -1.2 \sim -2.0.$$

That is, a higher temperature leads to a smaller mobility, and the propagation delay of the inverter is thus made longer. Therefore, the delay line consisting of the inverters has a positive temperature coefficient. In addition, the delay of the delay line can be obtained by summing up that of each inverter. As temperature rises, since the delay of each single inverter becomes longer, the total delay of the delay line becomes longer as well. As a result, the delay of the delay line is positively proportional to the temperature variation. Above all, the temperature-to-time circuit 22 can consist of delay cells with a positive temperature coefficient, where its delay becomes longer as temperature rises, and FIG. 5*a* demonstrates an example of a temperature characteristic curve of $T_D$. On the other hand, the temperature-to-time circuit 22 can consist of delay cells with a negative temperature coefficient, where its delay time becomes shorter as temperature rises, of which an example of temperature characteristic curve of $T_D$ is shown in FIG. 5*c*.

Figure 4B:
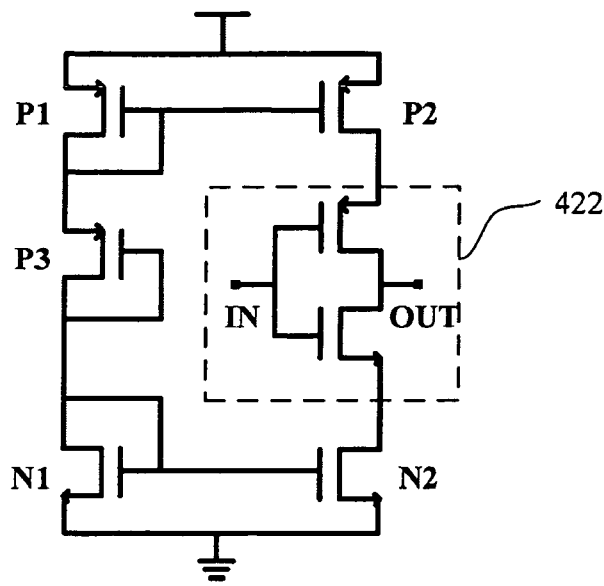
FIG. 4b is a diagram showing a temperature-compensated delay cell comprised of an inverter in accordance with a preferred embodiment of the present invention.

In a preferred embodiment of the present invention, the adjustable time reference circuit 24 not only uses a CMOS inverter as a basic delay cell, but also uses a temperature-compensated method to compensate thermal sensitivity of the CMOS inverter, so that thermal sensitivity of the adjustable time reference circuit 24 is reduced or eliminated. As shown in FIG. 4*b*, a temperature-compensated delay cell consists of a CMOS inverter 422 (inside the dash line block) and a thermal-compensation circuit (outside the dash line block). The MOS threshold voltage $V_T$ can be represented as:

$$V_T(T)=V_T(T_0)+\alpha(T-T_0),$$

where α=−0.5~−0.3 mV/K. The threshold voltage $V_T$ decreases as temperature rises. That is, for the two diode-connected transistors P1 and N1, the voltage difference between drain and source will decrease as temperature rises. In the meantime, the voltage between the two ends of the diode-connected transistor P3 will increase, and a current flowing through the transistor P3 will increase, too. As shown in FIG. 4*b*, the transistors P1, P2 and the transistors N1, N2 form current mirrors respectively. Therefore, the current flowing by the COMS inverter 422 will increase as temperature rises. Although the intrinsic delay of the COMS inverter 422 will increase as temperature rises, the thermal-compensation circuit will supply additional current to the COMS inverter 422 so that the current flowing by the delay cell is kept approximately constant. As a result, the thermal sensitivity of the delay cell is greatly reduced or even eliminated. In one embodiment, the temperature-to-time circuit 22 can be designed as a circuit with a negative temperature coefficient. As shown in FIG. 4b, the two current mirrors formed by the transistors P1, N1, and the transistors N1, N2 introduce current into P-type and N-type transistors of the inverter 422 for compensating the current flowing by the inverter 422. If the compensative current is too large (equivalent to over-compensation), the current flowing by the inverter 422 will increase as temperature rises. That is, the delay of the delay cell will decrease as temperature rises. Therefore, a delay cell with a negative temperature coefficient is obtained.

Figure 5A:
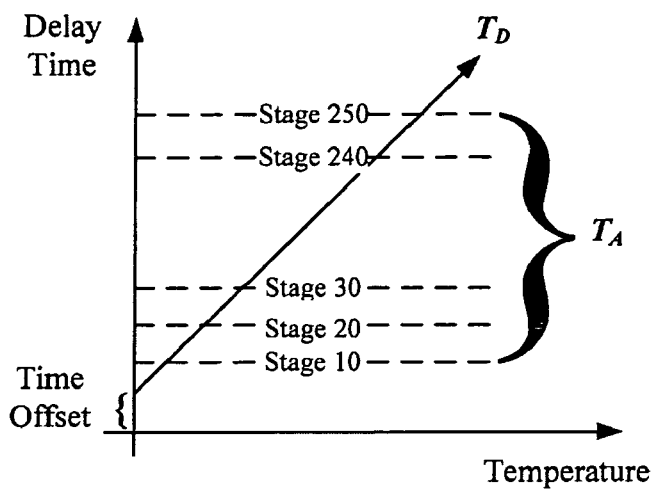
FIG. 5a is a diagram illustrating the timing between a temperature-to-time circuit and an adjustable time reference circuit in accordance with a preferred embodiment of the present invention.

FIG. 5a shows a timing relationship between the outputs of the temperature-to-time circuit 22 and the adjustable time reference circuit 24 in accordance with a preferred embodiment of the present invention. The delay of the thermally sensitive time signal $T_D$ is preferably proportional to the test temperature linearly, and the delay of the time reference signal $T_A$ is preferably proportional to the digital set value of the logic control circuit 28 linearly. In addition, the delay of the time reference signal $T_A$ is set insensitive to temperature variation, in other words, irrelevant to the temperature variation, or is slightly sensitive to temperature variation. For different digital set values, different intersection or trip temperatures of $T_D$ and $T_A$ are obtained. Whether the delay of the signal $T_D$ is shorter or longer than the delay of the signal $T_A$ is determined by the time comparator 26. If the signal $T_D$ is shorter than the signal $T_A$, the delay of signal $T_A$ is over set. The time comparator 26 will issue the time comparison signal Comp with a predefined logic level to the logic control circuit 28 for reducing the delay of the signal $T_A$ by lowering the digital value. Conversely, if the signal $T_D$ is longer than the signal $T_A$, the delay of signal $T_A$ is under set. The time comparator 26 will issue the time comparison signal Comp with an alternative logic level to the logic control circuit 28 for increasing the delay of the signal $T_A$ by enlarging the digital value. The above-mentioned operation is repeated until the delays of the signal $T_A$ and the signal $T_D$ are closest, and at this time, the digital set value of logic control circuit 28 is assigned as the output of the digital temperature sensing system 20. Taking FIG. 5a as an example, when the test temperature becomes higher, the delay of the signal $T_D$ will become longer, and the intersection of the $T_D$ curve and a series of $T_A$ curves will move in an upward and rightward direction. It means that the digital set value for the signal $T_A$ needs to be programmed larger. It fits the operation requirement of the temperature-to-time circuit 22 with a positive temperature coefficient.

Figure 5B:
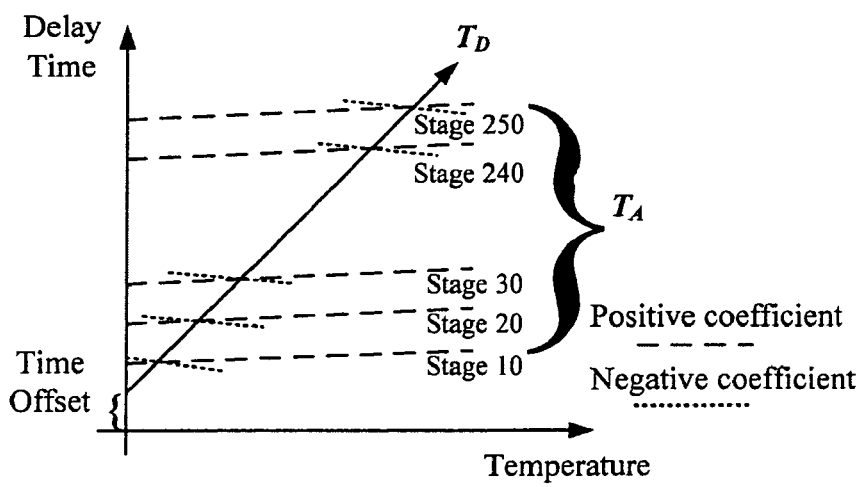
FIG. 5b is a diagram illustrating the timing between a temperature-to-time circuit and an adjustable time reference circuit with a positive or negative temperature coefficient in accordance with a preferred embodiment of the present invention.
Figure 5C:
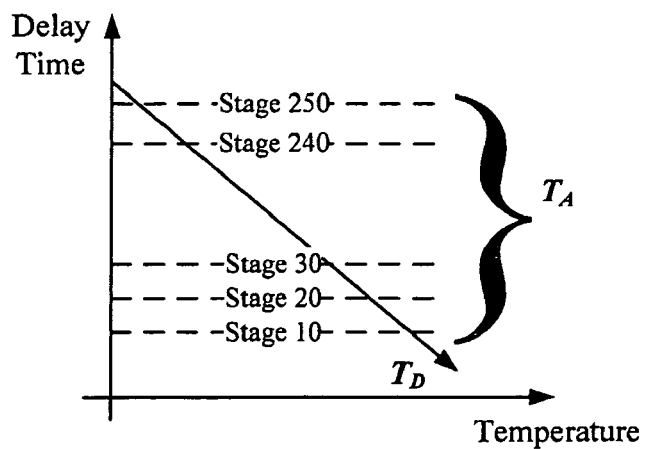
FIG. 5c is a diagram illustrating the timing between a temperature-to-time circuit with a negative temperature coefficient and an adjustable time reference circuit in accordance with a preferred embodiment of the present invention.

It is noted that the signal $T_A$ of the adjustable time reference circuit 24 does not have to be completely insensitive to temperature variation. It suffices that the signal $T_A$ is less thermally sensitive than the signal $T_D$ of the temperature-to-time circuit 22. As shown in FIG. 5b, regardless whether the temperature coefficient of the signal $T_A$ is positive or negative, the intersection of the $T_D$ curve and a series of $T_A$ curves still moves upward as temperature rises. The temperature-to-time circuit 22 functions the same.

For the signal $T_D$ of the temperature-to-time circuit 22 with a negative temperature coefficient, the delay of the signal $T_D$ becomes shorter when the test temperature becomes higher. As shown in FIG. 5c, the intersection of the $T_D$ curve and a series of $T_A$ curves will move in a downward and rightward direction. It means that the digital set value for the signal $T_A$ needs to be programmed smaller. It fits the operation requirement of the temperature-to-time circuit 22 with a negative temperature coefficient. Again, regardless whether the temperature coefficient of the signal $T_A$ is positive or negative, it suffices that the signal $T_A$ is less thermally sensitive than the signal $T_D$ of the temperature-to-time circuit 22. The intersection of the $T_D$ curve and a series of $T_A$ curves still moves downward as temperature rises. The temperature-to-time circuit 22 functions well also.

Figure 4C:
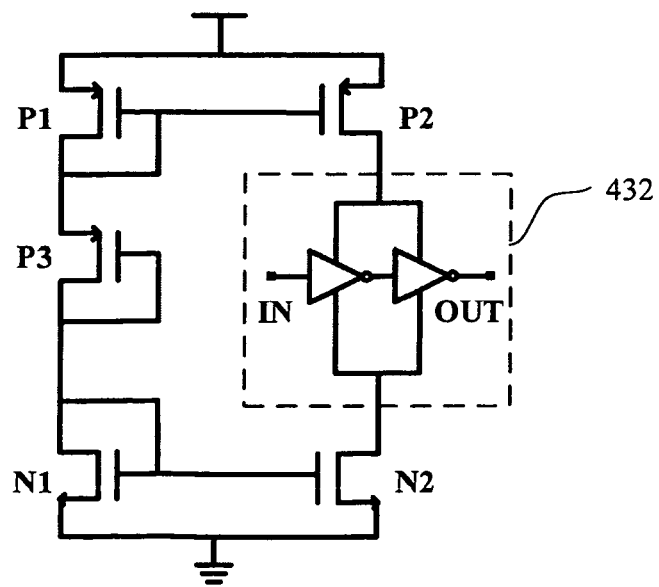
FIG. 4c is a diagram showing a temperature-compensated delay cell comprised of a buffer in accordance with a preferred embodiment of the present invention.

In a preferred embodiment of the present invention, the adjustable time reference circuit 24 comprises a temperature-compensated delay line which comprises a plurality of temperature-compensated delay cells connected in series. As shown in FIG. 4b, each temperature-compensated delay cell comprises a CMOS inverter 422 and a thermal-compensation circuit. In addition, as shown in FIG. 4c, each temperature-compensated delay cell also can comprise a buffer 432 which has two or an even number of CMOS inverters 422 connected in series. Moreover, the signal propagating in the temperature-compensated delay line can be tapped out sequentially to generate a delay proportional to the number of the delay stage tapped from the delay line.

The adjustable time reference circuit 24 comprises a temperature-compensated delay line, which comprises a plurality of temperature-compensated delay cells connected in series, and a delay stage selection unit. The temperature-compensated delay line generates the time reference signal $T_A$ by delaying the start signal START for a period of time required. The delay stage selection unit is used for adjusting the tap point of the temperature-compensated delay line according to the digital set value. The greater the digital set value is, the more the temperature-compensated delay cells are included in the transmission path of the start signal START. As a result, the delay gets longer.

Figure 6A:
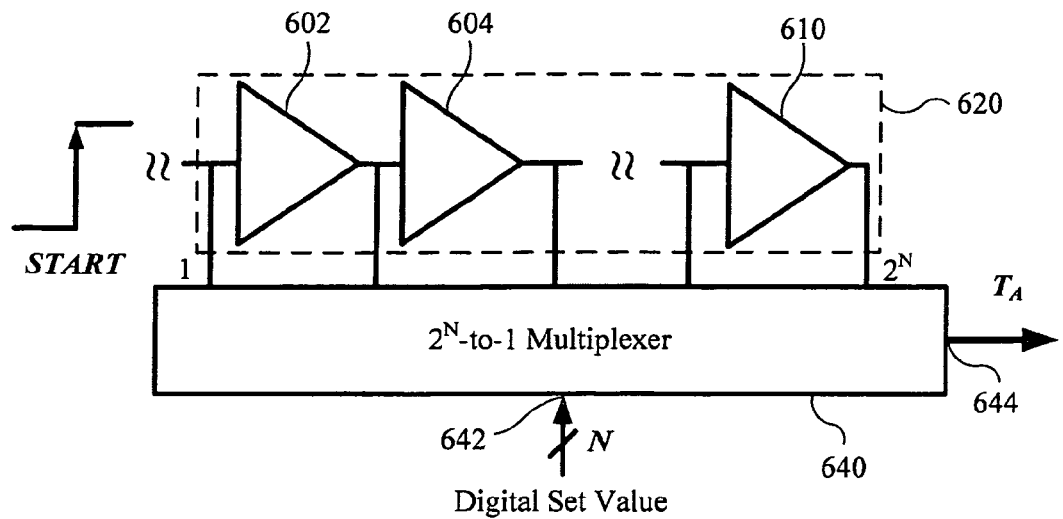
FIG. 6a is a diagram showing an adjustable time reference circuit implemented with a $2^N$-to-1 multiplexer in accordance with a preferred embodiment of the present invention.
Figure 6B:
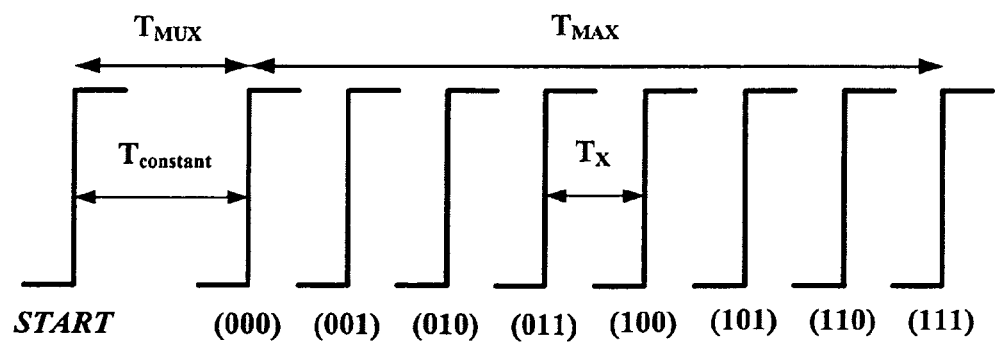
FIG. 6b is a diagram illustrating timing sequence of a time reference signal $T_A$ generated by a $2^N$-to-1 multiplexer.

FIG. 6a shows the adjustable time reference circuit 24 in accordance with a preferred embodiment of the present invention. The adjustable time reference circuit 24 comprises a temperature-compensated delay line 620 and a $2^N$-to-1 multiplexer 640. The temperature-compensated delay line 620 comprises a plurality of temperature-compensated delay cells (only cells 602, 604, and 610 shown in FIG. 6a) connected in series for delaying a start signal START for a period of time. The temperature-compensated delay cells correspond to delay stage selection terminals of the $2^N$-to-1 multiplexer 640 respectively (for example, the cell 602 corresponding to a first terminal and the cell 610 corresponding to a $2^N$th terminal, as shown in FIG. 6a). The multiplexer 640 selects one of the delay stage selection terminals to pass the start signal START to an output terminal 644 of the multiplexer 640 according to a digital set value inputted from an input terminal 642 of the multiplexer 640. Therefore, a time reference signal $T_A$ is generated. The delay of the signal $T_A$ is proportional to the digital set value. Since each delay cell is compensated, the delay of the signal $T_A$ is substantially constant with respect to temperature variation or is only slightly sensitive to temperature variation. An example of a 3-bit temperature-compensated delay line will be described, and the timing sequence of the signal $T_A$ is shown in FIG. 6b. The delay of the signal $T_A$ is represented as:

$$T_A = T_{constant} + T_{adj} = T_{MUX} + nT_X,$$

where $T_{constant}$ indicates the delay $T_{MUX}$ resulted from the multiplexer 640 itself and is a constant, $T_X$ represents a unit delay time of a single delay cell, n is the digital set value, and $T_{adj}$ represents the delay according to the digital set value n. The maximum value of $T_{adj}$ is indicated by $T_{MAX}$. As shown in FIG. 6b, the 3-bit digital set value can be one of the values (000), (001), (010), (011), (100), (101), (110), (111) corresponding to eight temperature-compensated delay cells respectively. That is, for a 3-bit adjustable time reference circuit, the minimal delay time is $T_{MUX}$, and the maximal delay time is $T_{MUX}+7T_X$.

Figure 7:
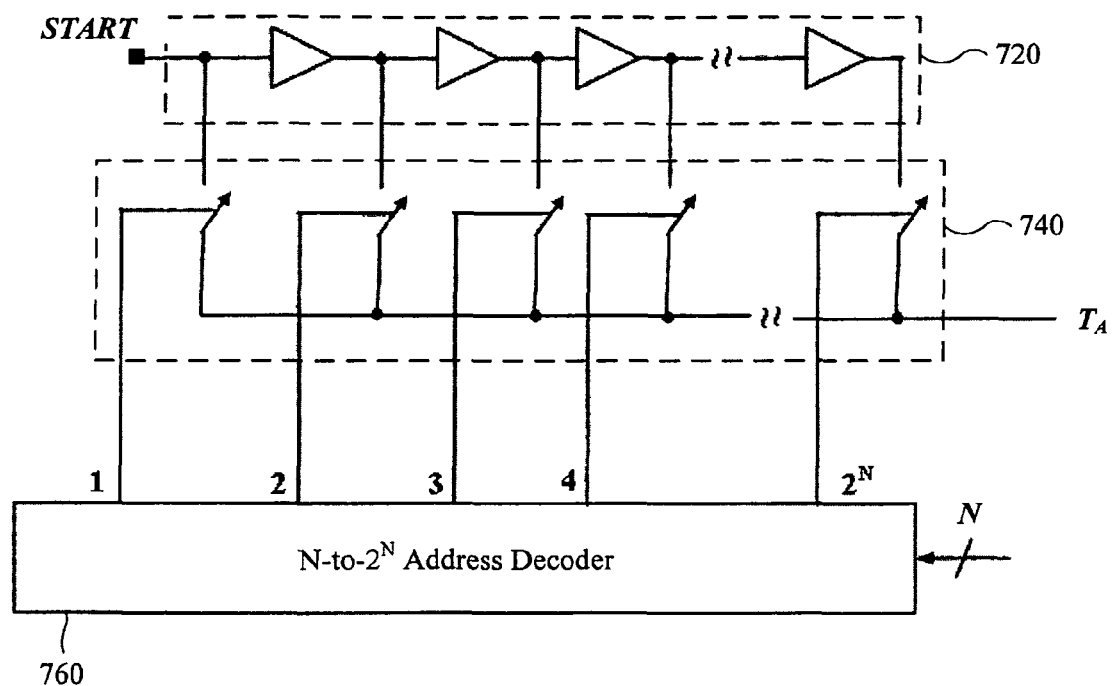
FIG. 7 is a diagram showing an adjustable time reference circuit implemented with an N-to-$2^N$ address decoder in accordance with a preferred embodiment of the present invention.

FIG. 7 shows the adjustable time reference circuit 24 in accordance with another preferred embodiment of the present invention. The adjustable time reference circuit 24 comprises a temperature-compensated delay line 720 for delaying a start signal START for a period of time; $2^N$ analog transmission gates 740; and an N-to-$2^N$ address decoder 760 for enabling one of the $2^N$ analog transmission gates 740 according to a digital set value. As shown in FIG. 7, the address decoder 760 receives the N-bit digital set value from an input terminal and has $2^N$ output terminals corresponding to the $2^N$ analog transmission gates 740. Each output terminal corresponds to a tap-out point of the delay line 720 through one analog transmission gate. In this circumstance, the $2^N$ analog transmission gates 740 and the N-to-$2^N$ address decoder 760 replace the $2^N$-to-1 multiplexer 640, and it is also applicable to select a delay stage according to the digital set value. Moreover, only one analog transmission gate is in the transmission path of the start signal START. Therefore, the total delay time of the signal $T_A$ can be represented as:

$$T_A = T_{constant} + T_{adj} = T_S + nT_X,$$

where $T_{constant}$ indicates that the delay $T_S$ resulted from only one analog transmission gate and is also a constant. Compared to the previous embodiment, the delay $T_S$ of the analog transmission gate in this example replaces a large delay $T_{MUX}$ of the multiplexer 640. Obviously, the delay $T_S$ is far less than the delay $T_{MUX}$. Therefore, $T_{constant}$ is greatly reduced in this circumstance and the total delay of the signal $T_A$ is dominated by $T_{adj}$. Furthermore, the delay $T_S$ can be designed to be less than the unit delay $T_X$ easily. That is, $T_{constant}$ is no more an important contribution to the total delay of the signal $T_A$ and can be neglected. Therefore, the measurement error caused by $T_{constant}$ is reduced greatly.

Figure 8A:
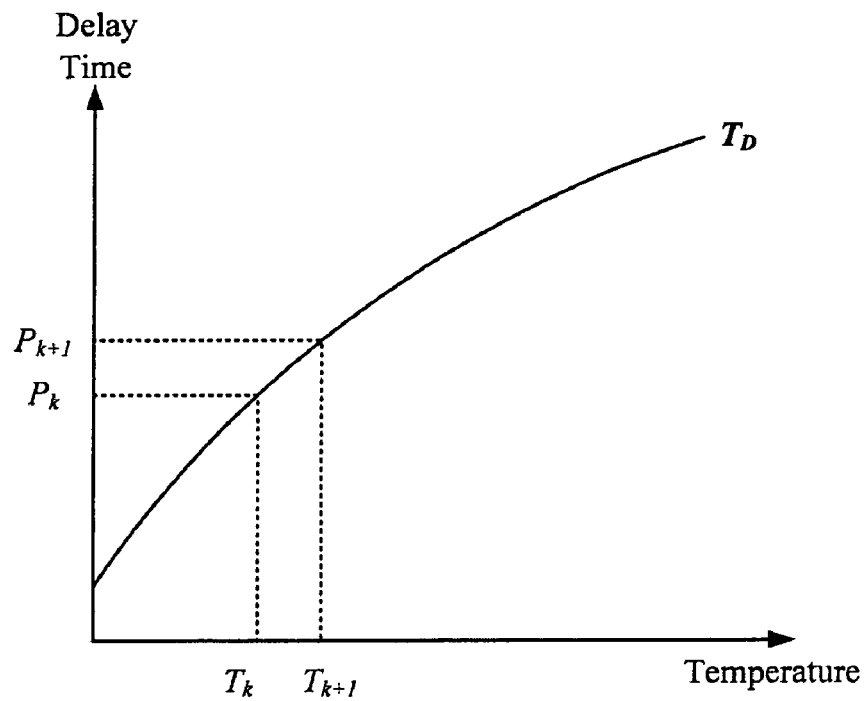
FIG. 8a is a diagram illustrating a temperature characteristic curve of a temperature-to-time circuit.
Figure 8B:
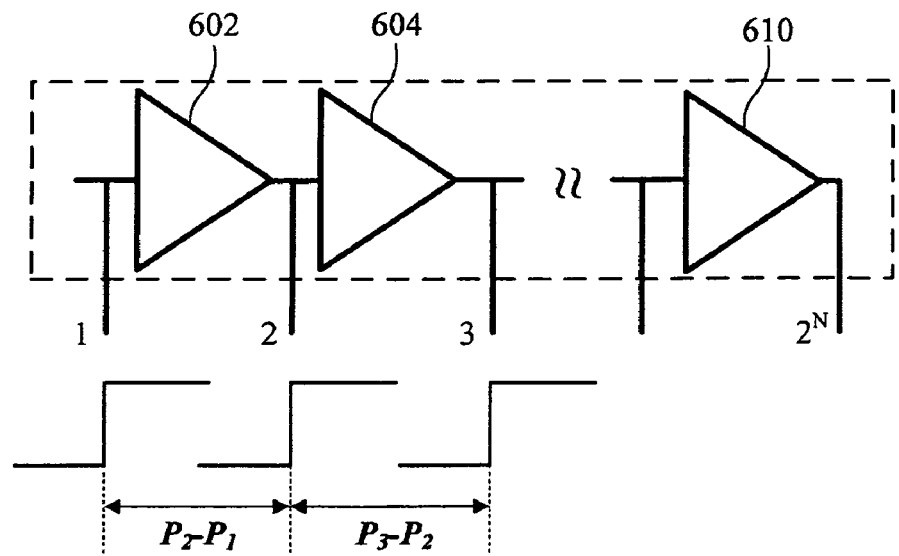
FIG. 8b is a diagram showing a temperature-compensated delay line of an adjustable time reference circuit for curvature correction.

The adjustable time reference circuit 24 can be designed to have a function of curvature correction in accordance with another preferred embodiment of the present invention. Since the delay of the temperature-to-time circuit 22 is not exactly proportional to temperature linearly, the characteristic line is curvy, as shown in FIG. 8a. For error reduction, the delay time of each delay stage for the adjustable time reference circuit 24 can be adjusted according to the temperature characteristic curve of the temperature-to-time circuit 22. Referring to FIG. 8a, the thermally sensitive time signal $T_D$ has delays $P_k$, $P_{k+1}$ at the test temperatures $T_k$, $T_{k+1}$ respectively. For a temperature-compensated delay line (shown in FIG. 8b) of the adjustable time reference circuit 24, delay of the kth delay stage can be designed as $P_{k+1}-P_k$. For example, a first delay stage 602 locates between a first tap-out point and a second tap-out point and its delay time is designed as $P_2-P_1$; a second delay stage 604 locates between a second tap-out point and a third tap-out point and its delay time is designed as $P_3-P_2$. Delays of other delay stages can be designed likewise. $P_1$, $P_2$, $P_3$ represent delays of the thermally sensitive time signal $T_D$ at the test temperatures $T_1$, $T_2$, $T_3$, respectively. Therefore, the function of curvature correction is realized.

Figure 9A:
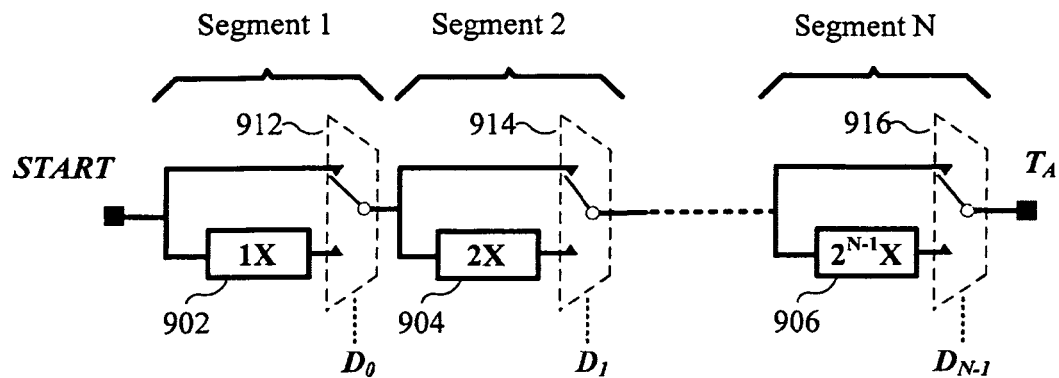
FIG. 9a is a diagram showing an adjustable time reference circuit implemented with delay segments in accordance with a preferred embodiment of the present invention.
Figure 9B:
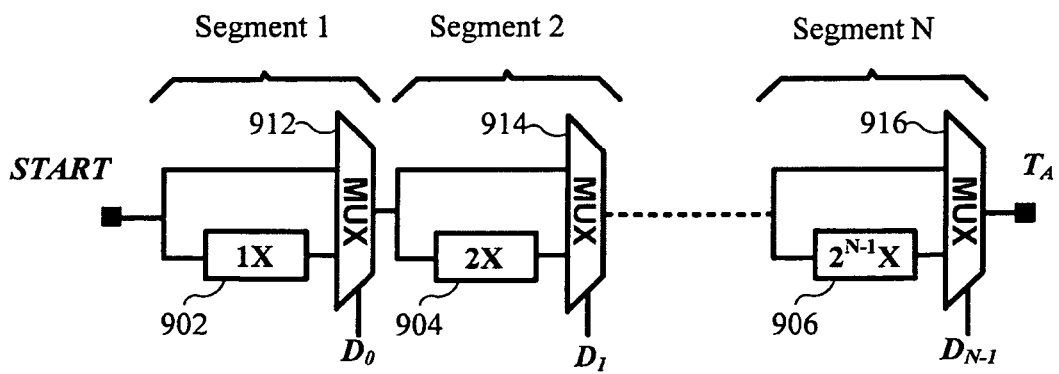
FIG. 9b is a diagram illustrating the adjustable time reference circuit implemented with the delay segments along with 2-to-1 multiplexers.

For reducing cost and simplifying layouts, the adjustable time reference circuit 24 can be realized with a binary-weighted manner. Referring to FIG. 9a, a diagram showing the adjustable time reference circuit 24 in accordance with another preferred embodiment of the present invention is given. The adjustable time reference circuit 24 realized with the binary-weighted manner comprises a plurality of selectable temperature-compensated delay segments connected in series. Each delay segment is bypassed or included in a transmission path of the time reference signal $T_A$ according to the value of a corresponding bit of the digital set value. The number of delay cells resident in each delay segment is scaled with binary weights. As shown in FIG. 9b, whether the delay of one delay segment is contributed to the delay of the signal $T_A$ is determined by a 2-to-1 multiplexer according to the value of a corresponding control bit. As shown in FIG. 9b, a first delay segment 902 comprises $2^0$ temperature-compensated delay cell, labeled 1X; a second delay segment 904 comprises $2^1$ temperature-compensated delay cells, labeled 2X an Nth delay segment 906 comprises $2^{N-1}$ temperature-compensated delay cells, labeled $2^{N-1}$X. In addition, the first, the second, and the Nth delay segments correspond to 2-to-1 multiplexers 912, 914, and 916, respectively. Taking the Kth delay segment as an example, the Kth delay segment comprises a short-circuit line, $2^{K-1}$ temperature-compensated delay cells, and one 2-to-1 multiplexer. When the Kth control bit $D_{k-1}$ is "0", the corresponding 2-to-1 multiplexer selects the short-circuit line for bypassing the Kth delay segment. On the other hand, when the Kth control bit $D_{k-1}$ is "1", the corresponding 2-to-1 multiplexer includes the Kth delay segment to the transmission path of the time reference signal $T_A$ to increase $2^{K-1}$ unit delays. Moreover, the delay segments are connected in series to form the adjustable time reference circuit 24. The control bit $D_0$ of the digital set value controls $2^0$ temperature-compensated delay cell (or the first delay segment); the control bit $D_1$ controls $2^1$ delay cells (or second delay segment); the control bit $D_{N-1}$ controls $2^{N-1}$ delay cells (or Nth delay segment). Because every 2-to-1 multiplexer is definitely included in the transmitting path of the signal $T_A$, the constant delay of the signal $T_A$ is now $NT_{MUX}$. The total delay of the signal $T_A$ can be represented as:

$$T_A = T_{constant} + T_{adj} = NT_{MUX} + nT_X.$$

In comparison to the example of utilizing only one $2^N$-to-1 multiplexer, in this example, replacing the only one $2^N$-to-1 multiplexer with multiple 2-to-1 multiplexers can reduce chip area and layout complexity.

Figures 10A, 10B:
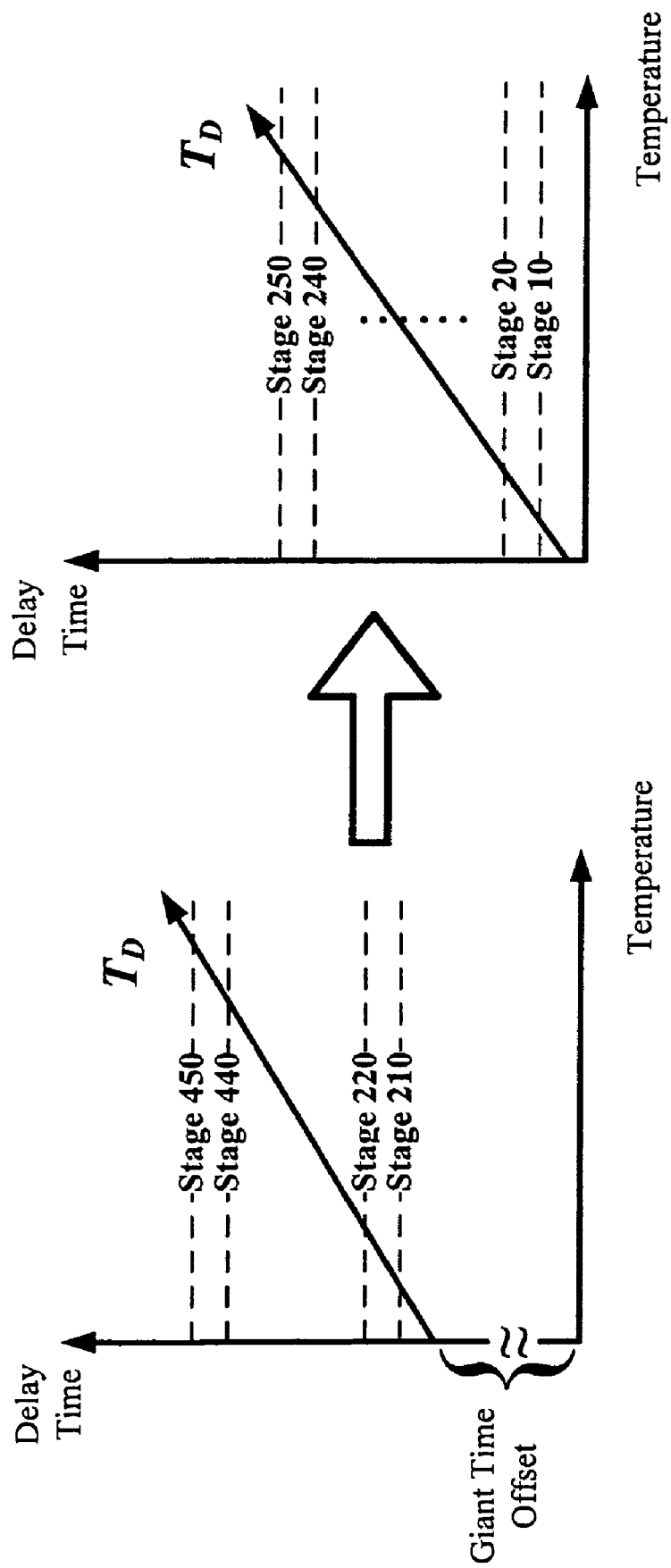
FIG. 10a is a diagram illustrating a large time offset faced at the lower temperature bound.
FIG. 10b is a diagram illustrating the improved time offset faced at the lower temperature bound.

Generally, the temperature operation range of the temperature-to-time circuit 22 is far above absolute zero degree. As shown in FIG. 10a, it causes a large offset at the lower temperature bound. That is, the output delay of the signal $T_D$ at the lower temperature bound is usually much larger than zero. This will induce a long conversion time and require a large number of output bits. To improve this drawback, it needs to insert a number of the temperature-compensated delay cells at the beginning of the temperature-compensated delay line in the adjustable time reference circuit 24 to reduce the time offset and adjust the temperature measurement range at the same time. These extra temperature-compensated delay cells are referred to as "offset-compensation delay cells". As shown in FIG. 10b, the large offset is corrected or modified to be a relatively small one. In addition, this offset cancellation greatly reduces the number of output bits required.

Figure 11:
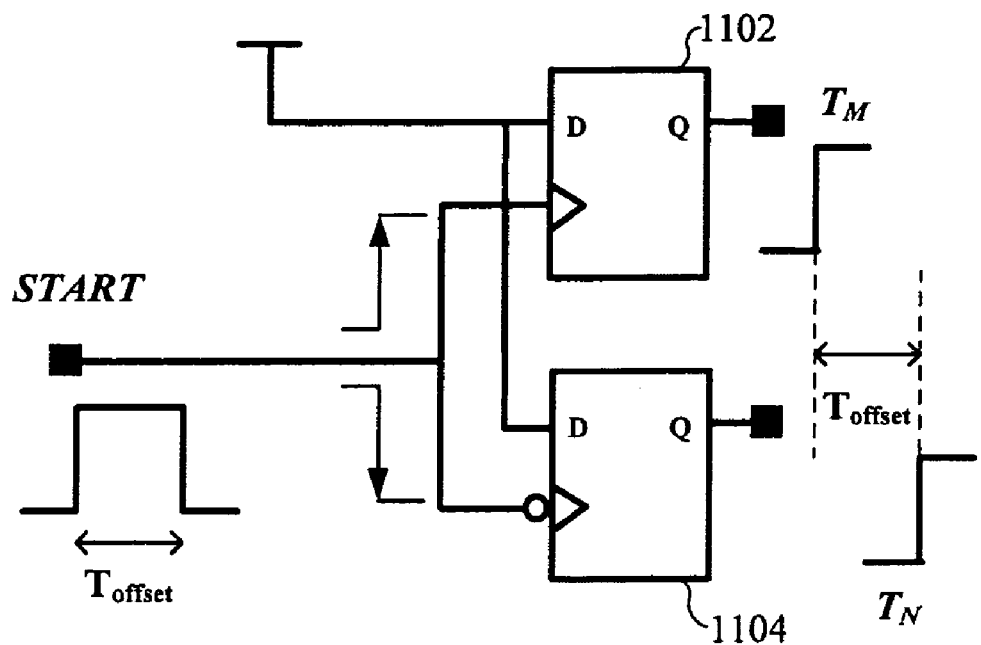
FIG. 11 is a diagram showing a time offset cancellation circuit implemented as a positive-edge-triggered DFF and a negative-edge-triggered DFF in accordance with a preferred embodiment of the present invention.

Instead of inserting the offset-compensation delay cells to the temperature-to-time circuit 22, a simple but practical time offset cancellation circuit is proposed and realized. As shown in FIG. 11, the offset cancellation circuit comprises two D-type flip-flops (DFFs), that is, a positive-edge-triggered DFFp 1102 and a negative-edge-triggered DFFn 1104. At first, a pulse START is fed to the clock inputs of both DFFs. The width of the pulse START is designed to be equivalent to $T_{offset}$, the above-mentioned time offset at the lower temperature bound. The positive-edge-triggered DFFp 1102 is triggered by the positive edge of the pulse START, and in turn generates a step signal $T_M$ which is sent to the input of the temperature-to-time circuit 22. Similarly, the negative edge of the pulse START triggers the negative-edge-triggered DFFn 1104 to yield a step signal $T_N$ for the adjustable time reference circuit 24. The delay difference between the step signals $T_M$ and $T_N$ will be identical to the time offset $T_{offset}$. By adopting the time offset cancellation circuit, the large chip area occupied by the offset-compensation delay cells can be saved, so is the required number of output bits.

Figure 12:
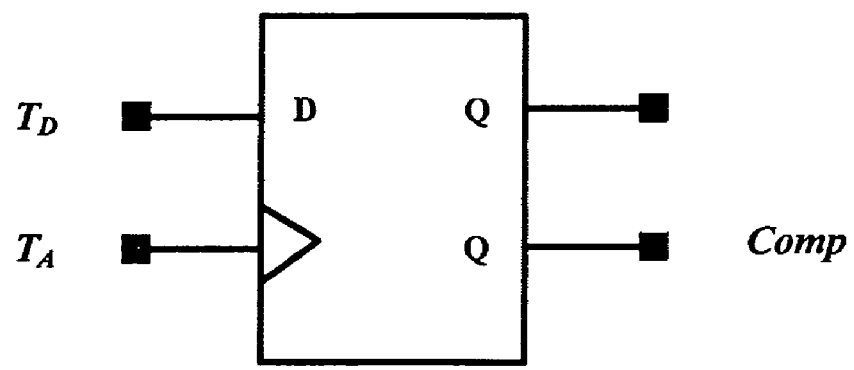
FIG. 12 is a diagram showing a time comparator implemented as a DFF in accordance with a preferred embodiment of the present invention.

Referring to FIG. 12, a diagram showing the time comparator 26 in accordance with a preferred embodiment of the present invention is given. A simple DFF is good enough to be the time comparator 26 for easy implementation. The DFF compares the signal $T_D$ from the temperature-to-time circuit 22 and the signal $T_A$ from the adjustable time reference circuit 24. As shown in FIG. 12, two input terminals of the DFF receive the signal $T_D$ and the signal $T_A$ respectively. When the width of signal $T_D$ is shorter than that of signal $T_A$, it indicates that the signal $T_A$ lags the signal $T_D$. The time comparator 26 will sent the time comparison signal Comp with a logic LOW level to the logic control circuit 28 for reducing the delay of the signal $T_A$. On the other hand, when the width of signal $T_D$ is longer than that of signal $T_A$, it indicates that the signal $T_A$ leads the signal $T_D$. The time comparator 26 will sent the time comparison signal Comp with a logic HIGH level to the logic control circuit 28 for increasing the delay time of the signal $T_A$.

The logic control circuit 28 controls the signal $T_A$ of the adjustable time reference circuit 24 according to the time comparison signal Comp of the time comparator 26. The logic control circuit 28 can be implemented as a shift register control logic, a counter control logic, or a successive-approximation-register control logic (SAR). These three examples will be described respectively in the following.

Figure 13:
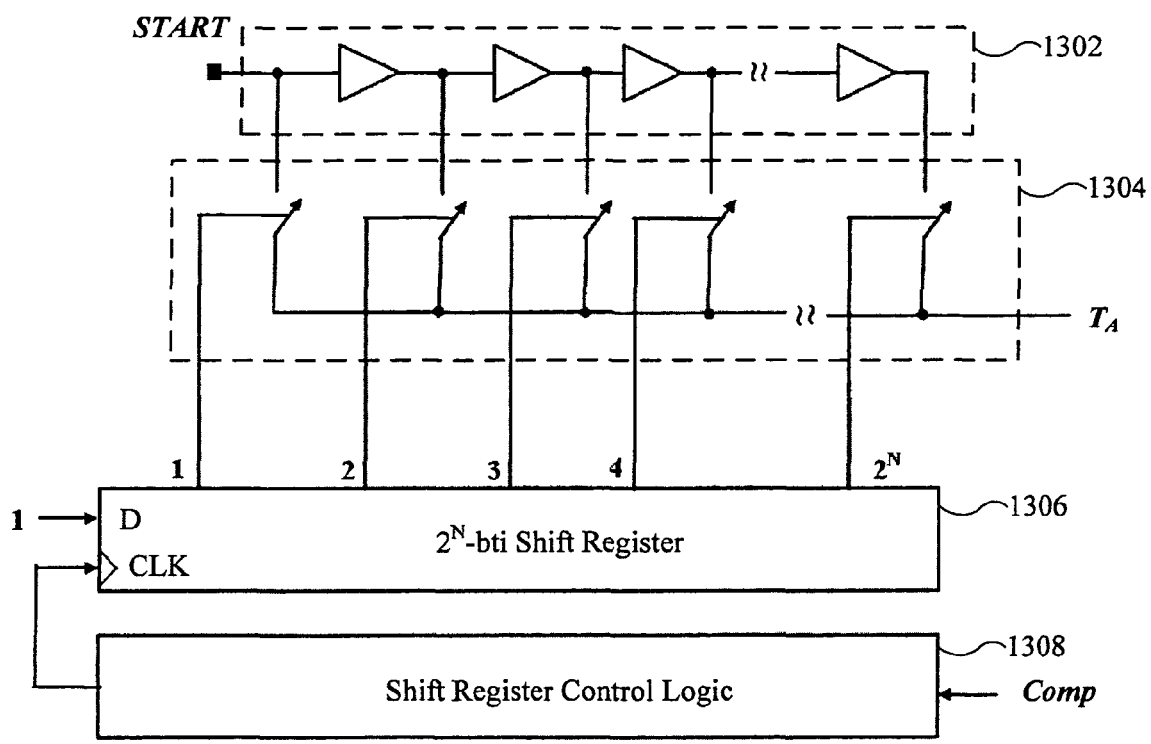
FIG. 13 is a diagram showing a logic control circuit implemented as a shift register control logic in accordance with a preferred embodiment of the present invention.

Referring to FIG. 13, which is a diagram showing the logic control circuit 28 implemented as a shift register control logic 1308 in accordance with a preferred embodiment of the present invention, the adjustable time reference circuit 24 comprises a temperature-compensated delay line 1302, a plurality of analog transmission gates 1304, and a $2^N$-bit shift register 1306. The shift register control logic 1308 receives the time comparison signal Comp from the time comparator 26 for controlling the $2^N$-bit shift register 1306 to shift a bit each time. Each bit of the shift register 1306 can be used for enabling a corresponding analog transmission gate. One analog transmission gate corresponds to one tap-out point of the delay line 1302. As shown in FIG. 13, the $2^N$-bit shift register 1306 is utilized for $2^N$ temperature-compensated delay cells. Each bit of the shift register 1306 can tap out a corresponding temperature-compensated delay cell through a corresponding analog transmission gate to be the output of the adjustable time reference circuit 24 so that the start signal START is delayed a required period of time. Because the shift register 1306 only can shift one bit per time, each time only one unit delay of the temperature-compensated delay cell can be adjusted for the adjustable time reference circuit 24. The adjusting speed is slow for this implementation. However, It owns better linearity and causes smaller measurement errors.

Figure 14:
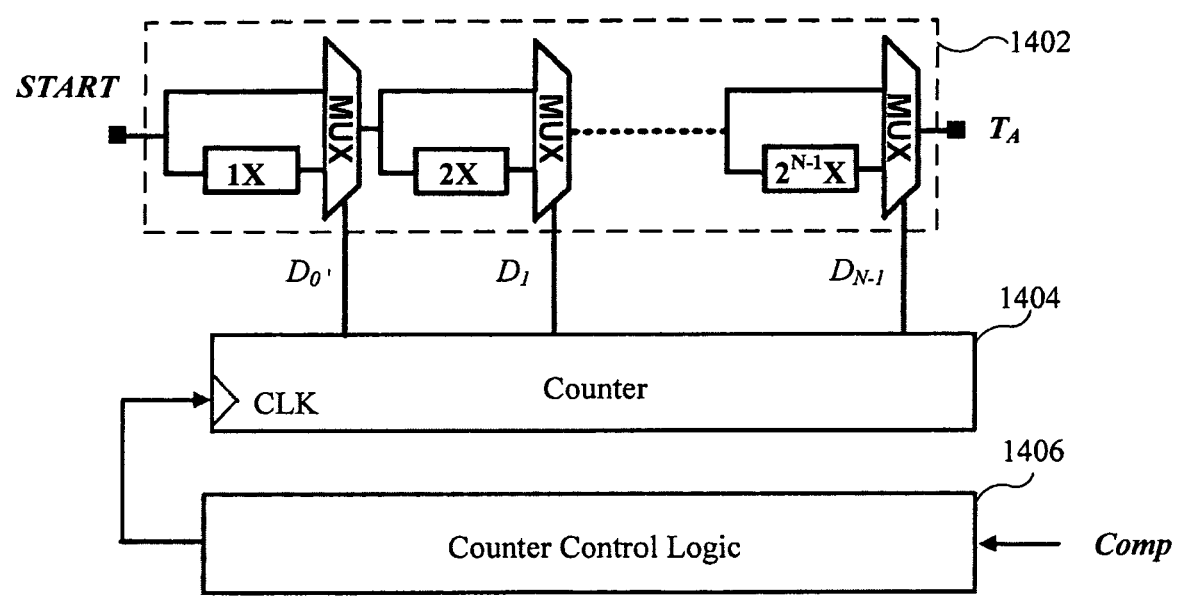
FIG. 14 is a diagram showing a logic control circuit implemented as a counter control logic in accordance with a preferred embodiment of the present invention.

Referring to FIG. 14, which is a diagram showing the logic control circuit 28 implemented as a counter control logic 1406 in accordance with a preferred embodiment of the present invention. The adjustable time reference circuit 24 comprises a binary-weighted delay line 1402 and a counter 1404. An N-bit counter is utilized for N segments of the binary-weighted delay line 1402. The counter control logic 1406 receives the time comparison signal Comp from the time comparator 26 for controlling the counter 1404 to increase or decrease one each time. Each bit of the counter 1404 can be used for controlling a corresponding multiplexer (MUX). As shown in FIG. 14, the control bit $D_0$ controls $2^0$ temperature-compensated delay cell (or the first delay segment); the control bit $D_1$ controls $2^1$ delay cells (or the second delay segment); the control bit $D_{N-1}$ controls $2^{N-1}$ delay cells (or the Nth delay segment). The counter control logic 1406 can alter the delay of the adjustable time reference circuit 24 by controlling the counter 1404 to count up or count down. Because the counter 1404 can count up or down by one, only one unit delay of the delay cell can be adjusted for the adjustable time reference circuit 24 each time. By applying this implementation, the adjusting speed is slow. The linearity of the binary-weighted delay line 1402 is worsened and the larger measurement errors will be resulted. However, the advantage of utilizing the counter control logic 1406 in company with the counter 1404 is that the large chip area occupied by the shift register 1306 can be saved, and so the cost is reduced.

Figure 15:
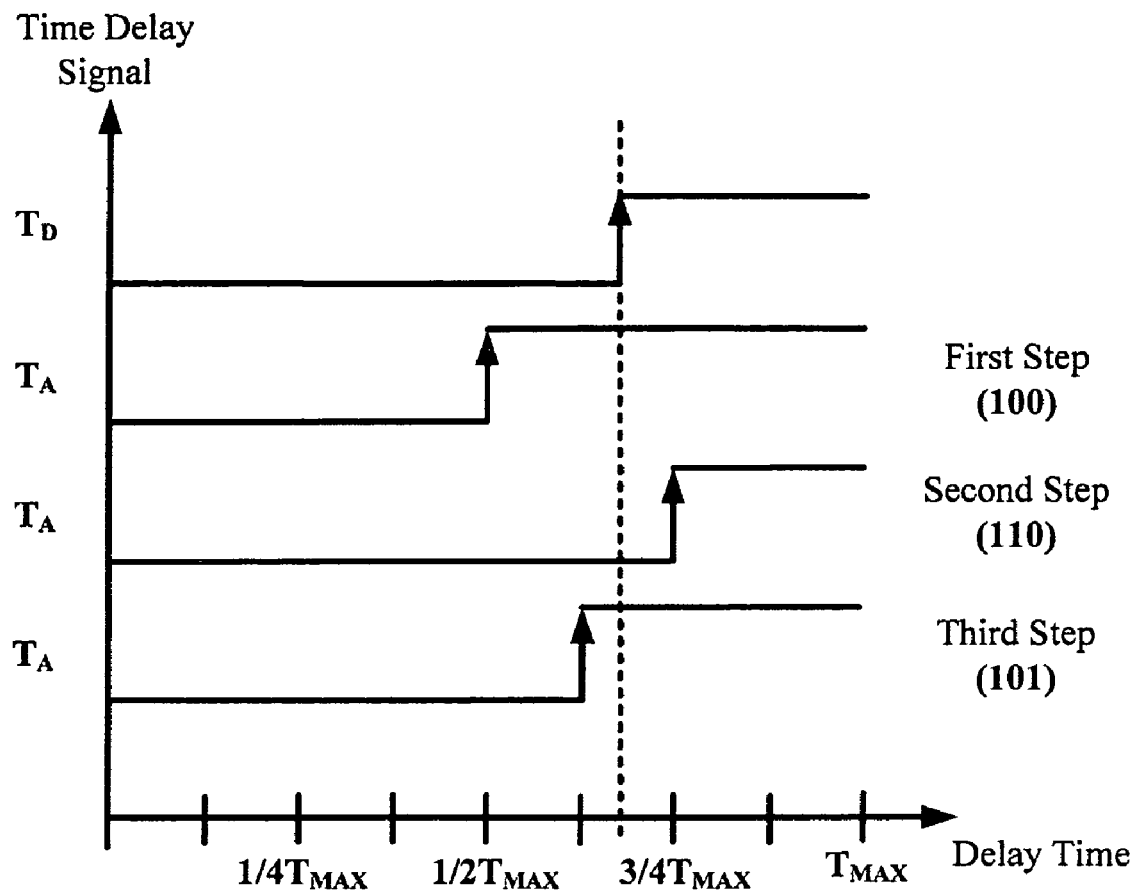
FIG. 15 is a diagram illustrating timing sequence of a logic control circuit implemented as a successive-approximation-register control logic (SAR) in accordance with a preferred embodiment of the present invention.

Referring to FIG. 15, which is a diagram showing the logic control circuit 28 implemented as a successive-approximation-register control logic (SAR) in accordance with a preferred embodiment of the present invention, taking a 3-bit SAR as an example. The 3-bit SAR utilizes binary searching to increase the speed for adjusting the adjustable time reference circuit 24. At first, The most significant bit (MSB) of the digital set value is processed. The digital set value is set to "100". In the meanwhile, the time comparator 26 determines that the width of signal $T_A$ is shorter than that of signal $T_D$. The time comparator 26 outputs a time comparison signal Comp with logic HIGH level for preserving the MSB "1" of the digital set value. Secondly, the bit next to MSB of the digital set value is processed and the digital set value is set to "110". Since the width of signal $T_A$ is longer than that of signal $T_D$, the time comparator 26 outputs a time comparison signal Comp with logic LOW level for resetting the second bit with "0". Finally, the least significant bit (LSB) of the digital set value is processed and the digital set value is set to "101". Since the width of signal $T_A$ is shorter than that of signal $T_D$, the third bit "1" is persevered. At this time, the delays of the signal $T_A$ and the signal $T_D$ are closest. The digital set value "101" is set to be the digital output of the present temperature sensing circuit.

Figure 16A:
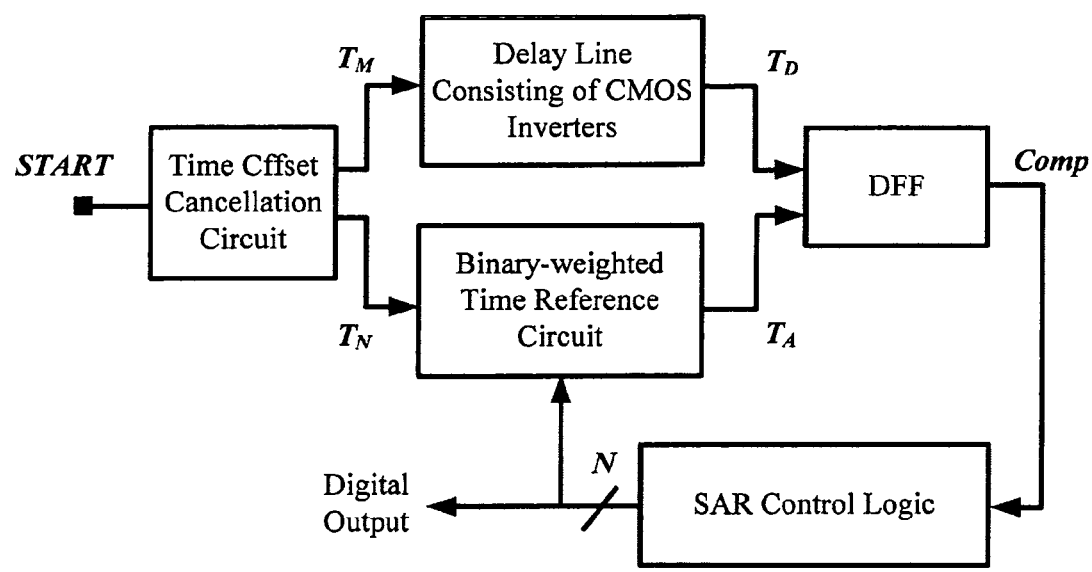
FIG. 16a is a circuit structure diagram showing a digital temperature sensing chip implemented in accordance with a preferred embodiment of the present invention.
Figure 16B:
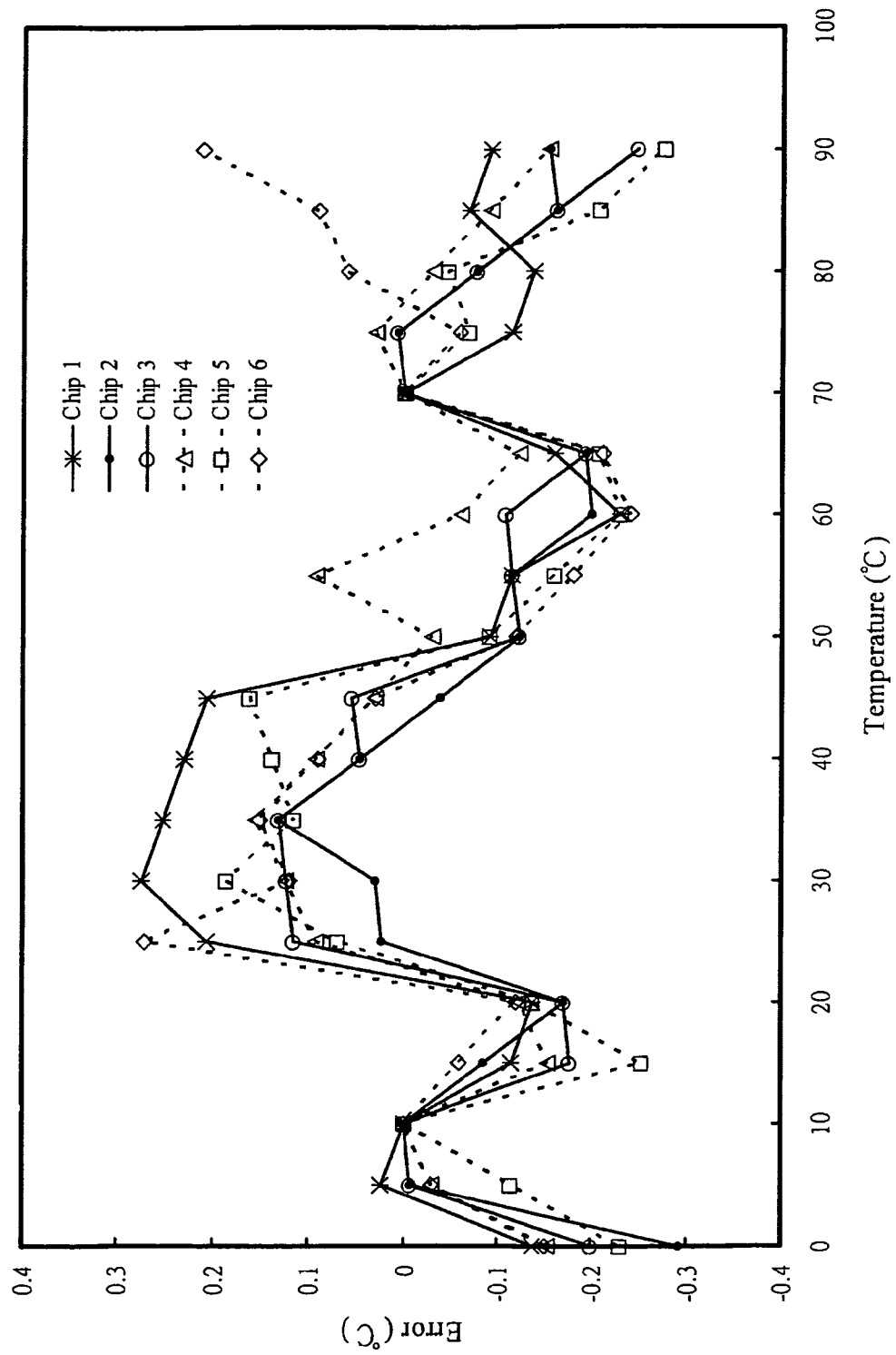
FIG. 16b is a diagram depicting measurement error of six digital temperature sensing chips implemented in accordance with a preferred embodiment of the present invention.

To prove that the present invention is practicable, a preferred embodiment in accordance with the present invention is provided with a circuit architecture illustrated in FIG. 16a and can be implemented as a single-chip IC available from Taiwan Semiconductor Manufacturing Company Ltd. (TSMC). The chip area is 750 μm×800 μm. The temperature-to-time circuit of the chip is implemented as a delay line consisting of CMOS inverters; the adjustable time reference circuit is a binary-weighted time reference circuit; the time comparator is a D-type flip-flop (DFF); the logic control circuit is a SAR control logic; and the time offset cancellation circuit is implemented as two DFFs, a positive-edge-triggered DFF and a negative-edge-triggered DFF. To figure out the performance of the proposed circuit, the measurement of six packaged 10-bit temperature sensing chips was done around the 0° C.-90° C. temperature range. With the excellent linearity, the measurement errors are only ±0.3° C. after two point calibration, as illustrated in FIG. 16b. The proposed circuit of the present invention is superior, in the performance, to most commercial ICs.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A digital temperature sensing system for converting a test temperature into a digital output signal, the system comprising:
 a temperature-to-time circuit for generating a thermally sensitive time signal of which a width varies with the test temperature;
 an adjustable time reference circuit having a digital input terminal for receiving a digital set value from the digital input terminal and generating a time reference signal of which a width changes with the digital set value;
 a time comparator receiving the thermally sensitive time signal and the time reference signal for generating a time comparison signal according to the width difference between the thermally sensitive time signal and the time reference signal;
 a logic control circuit receiving the time comparison signal for adjusting the digital set value of the adjustable time reference circuit according to the time comparison signal so that the width of the thermally sensitive time signal and the width of time reference signal are close enough or substantially equal; and
 a digital output terminal electrically connected to the digital input terminal of the adjustable time reference circuit for providing the digital output signal to be an output of the digital temperature sensing system.

2. The digital temperature sensing system of claim 1, wherein the temperature-to-time circuit comprises a plurality of thermally sensitive delay cells connected in series.

3. The digital temperature sensing system of claim 2, wherein each thermally sensitive delay cell of the temperature-to-time circuit comprises an inverter.

4. The digital temperature sensing system of claim 1, wherein the adjustable time reference circuit comprises a temperature-compensated delay line, which comprises a plurality of temperature-compensated delay cells connected in series, for delaying an inputted start signal for a period of time.

5. The digital temperature sensing system of claim 4, wherein each temperature-compensated delay cell comprises an inverter and a thermal-compensation circuit.

6. The digital temperature sensing system of claim 4, wherein the temperature-compensated delay line comprises a plurality of delay sections, each delay section comprising a plurality of temperature-compensated delay cells connected in series, and wherein a number of delay cells for each delay section is arranged according to the characteristic curve of the delay of a thermally sensitive time signal versus the temperature so that the adjustable time reference circuit realizes a function of curvature correction.

7. The digital temperature sensing system of claim 1, wherein the adjustable time reference circuit comprises:
 a temperature-compensated delay line, which comprises a plurality of temperature-compensated delay cells connected in series; and
 a delay stage selection unit for adjusting the temperature-compensated delay line according to the digital set value,
wherein the delay stage selection unit selects one of the temperature-compensated delay cells of the delay line as an output of the adjustable time reference circuit corresponding to the digital set value to change the number of the temperature-compensated delay cells resident in the transmission path of a start signal inputted to the delay line for delaying the start signal a period of time corresponding to the digital set value and then the delayed start signal is transmitted to the output of the adjustable time reference circuit.

8. The digital temperature sensing system of claim 7, wherein the delay stage selection unit is a $2^N$-to-1 multiplexer, which has $2^N$ terminals electrically connected to the temperature-compensated delay cells respectively and an input terminal for receiving the digital set value, and wherein the multiplexer selects the one of the temperature-compensated delay cells of the delay line as an output of the multiplexer according to the digital set value so that the start signal is delayed a period of time corresponding to the digital set value.

9. The digital temperature sensing system of claim 7, wherein the delay stage selection unit comprises:
 a plurality of analog transmission gates; and
 an N-to-$2^N$ address decoder for enabling one of the analog transmission gates according to the digital set value,
wherein the analog transmission gates are electrically connected between the temperature-compensated delay cells and the output of the adjustable time reference circuit, and N bits of the address decoder receives the digital set value for enabling the one of the analog transmission gates which conducts a corresponding temperature-compensated delay cell of the delay line to the output of the adjustable time reference circuit so that the start signal is delayed a period of time corresponding to the digital set value.

10. The digital temperature sensing system of claim 1, wherein the adjustable time reference circuit comprises a plurality of selectable temperature-compensated delay segments connected in series, each delay segment further comprising a plurality of temperature-compensated delay cells connected in series, and wherein each delay segment corresponds to each bit of the digital set value, and a number of the delay cells of each delay segment is scaled with binary weights to be bypassed or included in a transmission path of the time reference signal so that a start signal is delayed a period of time corresponding to the digital set value, and the start signal is outputted as the time reference signal.

11. The digital temperature sensing system of claim 1, wherein the time comparator comprises a D-type flip-flop (DFF).

12. The digital temperature sensing system of claim 1, wherein the logic control circuit comprises a shift register control logic.

13. The digital temperature sensing system of claim 1, wherein the adjustable time reference circuit comprises:
 a temperature-compensated delay line, which comprises a plurality of temperature-compensated delay cells connected in series;
 a plurality of analog transmission gates; and
 a shift register for memorizing the digital set value and enabling one of the analog transmission gates according to the digital set value,
wherein the analog transmission gates are electrically connected between the temperature-compensated delay cells and an output of the adjustable time reference circuit as gateways for the shift register; and the logic control circuit comprises:

a shift register control logic, receiving the time comparison signal from the time comparator, for controlling the digital set value of the shift register to shift a bit each time for selecting a corresponding analog transmission gate which conducts a corresponding temperature-compensated delay cell of the delay line to the output of the adjustable time reference circuit so that a start signal is delayed a period of time corresponding to the digital set value, and the start signal is outputted as the time reference signal.

14. The digital temperature sensing system of claim 1, wherein the logic control circuit comprises a counter control logic.

15. The digital temperature sensing system of claim 1, wherein the adjustable time reference circuit comprises:
- a plurality of selectable temperature-compensated delay segments connected in series, each delay segment comprising a plurality of temperature-compensated delay cells connected in series and a 2-to-1 multiplexer which is arranged between two delay segments; and
- a counter for counting the digital set value, each bit of the counter controlling a corresponding 2-to-1 multiplexer to determine whether a corresponding delay segment is included in a transmission path of a start signal or not according to the digital set value; and the logic control circuit comprises:
- a counter control logic, receiving the time comparison signal from the time comparator, for controlling the counter to increase or decrease one each time to alter a transmission time of the start signal passing through the delay segments, the counter control logic controlling the counter to adjust the digital set value so that the start signal is delayed a period of time corresponding to the digital set value, and the start signal is outputted as the time reference signal.

16. The digital temperature sensing system of claim 1, wherein the logic control circuit comprises a successive-approximation-register control logic (SAR).

17. The temperature sensing system of claim 1, wherein the adjustable time reference circuit comprises a plurality of temperature-compensated delay cells, which are connected in series in the front end of the adjustable time reference circuit, for reducing a time offset of the thermally sensitive time signal.

18. The temperature sensing system of claim 1 further comprising a time offset cancellation circuit, which is connected to the temperature-to-time circuit and the adjustable time reference circuit respectively, for reducing a time offset of the thermally sensitive time signal.

19. A digital temperature sensing method for converting a test temperature into a digital output signal, the method comprising the steps of:
- generating a thermally sensitive time signal of which a width varies with the test temperature;
- generating a time reference signal of which a width changes with a digital set value;
- generating a time comparison signal according to a width difference between the thermally sensitive time signal and the time reference signal;
- determining whether the widths of the thermally sensitive time signal and the width of time reference signal are close enough or substantially equal; and
- adjusting the digital set value according to the time comparison signal.

20. The temperature sensing method of claim 19, wherein when an n-th bit of the digital set value is "1", if the width of time reference signal generated with the digital set value is shorter than the width of the thermally sensitive time signal, the n-th bit of the digital set value "1" is preserved, otherwise, replaced with "0".

* * * * *